United States Patent
Cherel et al.

(10) Patent No.: US 9,600,685 B2
(45) Date of Patent: *Mar. 21, 2017

(54) DESTRUCTION OF SENSITIVE INFORMATION

(71) Applicant: International Business Machines Corporation, Armonk, NY (US)

(72) Inventors: Thomas Cherel, Saint-Eustache (FR); Ivan M. Milman, Austin, TX (US); Martin Oberhofer, Bondorf (DE); Donald A. Padilla, Albuquerque, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,574

(22) Filed: Jul. 16, 2013

(65) Prior Publication Data
US 2014/0136577 A1    May 15, 2014

Related U.S. Application Data

(63) Continuation of application No. 13/678,077, filed on Nov. 15, 2012.

(51) Int. Cl.
*G06F 7/00*    (2006.01)
*G06F 17/30*    (2006.01)
*G06F 21/62*    (2013.01)

(52) U.S. Cl.
CPC ................... *G06F 21/6227* (2013.01)

(58) Field of Classification Search
USPC ........................................................ 707/813
See application file for complete search history.

(56) References Cited

U.S. PATENT DOCUMENTS

| | | | | |
|---|---|---|---|---|
| 5,572,673 | A | * 11/1996 | Shurts | G06F 21/6218 707/999.2 |
| 7,716,242 | B2 | 5/2010 | Pae et al. | |
| 8,447,722 | B1 * | 5/2013 | Ahuja et al. | 707/607 |

(Continued)

FOREIGN PATENT DOCUMENTS

| | | |
|---|---|---|
| CN | 201828905 | 5/2011 |
| CN | 201859444 | 6/2011 |
| CN | 102158557 | 8/2011 |

OTHER PUBLICATIONS

English Abstract and Machine Translation for CN201828905U, published on May 11, 2011, Total 8 pp.

(Continued)

*Primary Examiner* — Alexey Shmatov
*Assistant Examiner* — Muluemebet Gurmu
(74) *Attorney, Agent, or Firm* — Janaki K. Davda; Konrad, Raynes, Davda and Victor LLP

(57) ABSTRACT

Provided are techniques for deleting sensitive information in a database. One or more objects in a database that are accessed by a statement are identified. It is determined that at least one object among the identified one or more objects contains sensitive information by checking an indicator for the at least one object. One or more security policies associated with the at least one object are identified. The identified one or more security policies are implemented for the at least one object to delete sensitive information.

7 Claims, 12 Drawing Sheets

(56) References Cited

U.S. PATENT DOCUMENTS

| | | | |
|---|---|---|---|
| 8,561,127 B1* | 10/2013 | Agrawal et al. | 726/1 |
| 2007/0288664 A1 | 12/2007 | Kim | |
| 2009/0158441 A1 | 6/2009 | Mohler et al. | |
| 2009/0292710 A1* | 11/2009 | Casey | G06F 21/6209 |
| 2010/0318489 A1 | 12/2010 | De Barros et al. | |
| 2011/0126290 A1 | 5/2011 | Krishnamurthy et al. | |
| 2011/0276610 A1 | 11/2011 | Hossain et al. | |
| 2012/0260307 A1* | 10/2012 | Sambamurthy et al. | 726/1 |

OTHER PUBLICATIONS

Gutmann, P., "Data Remanence in Semiconductor Devices", IBM T.J. Watson Research Center, [online]. Retrieved from the Internet at <URL: http://www.cypherpunks.to/~peter/usenix01.pdf>, 1996, Total 19 pp.

Gutmann, P., "Secure Deletion of Data from Magnetic and Solid-State Memory", Department of Computer Science, University of Auckland, [online], [Retrieved on Nov. 12, 2012]. Retrieved from the Internet at <URL: http://www.cs.auckland.ac.nz/~pgut001/pubs/secure_del.html>, Total 20 pp.

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

"Create Tablespace—IBM DB2 9.7 for Linux, UNIX, and Windows", [online], [Retrieved on May 18, 2012]. Retrieved from the Internet at <URL: http://publib.boulder.ibm.com/infocenter/db2luw/v9r7/topic/com/ibm . . . >, Total 19 pp.

eHOW, "How to Remove Personal Information in Track Changes in MS Word", [online], [Retrieved on Nov. 13, 2012]. Retrieved from the Internet at <URL: http://www.ehow.com/how_8215573_remove-track-changes-ms-word.html>, Total 4 pp.

U.S. Appl. No. 13/678,077, filed Nov. 15, 2012, entitled "Destruction of Sensitive Information", invented by Thomas Cherel et al., pp. 1-43.

Preliminary Amendment, dated Jul. 16, 2013, for U.S. Appl. No. 13/678,077, filed Nov. 15, 2012, entitled "Destruction of Sensitive Information", invented by Thomas Cherel et al., pp. 1-5.

Office Action, dated Apr. 7, 2014, for U.S. Appl. No. 13/678,077 (54.82), filed Nov. 15, 2012, entitled "Destruction of Sensitive Information", invented by Thomas Cherel et al., Total 23 pages.

Response to Office Action, dated Jul. 7, 2014, for U.S. Appl. No. 13/678,077 (54.82), filed Nov. 15, 2012, entitled "Destruction of Sensitive Information", invented by Thomas Cherel et al., Total 11 pages.

Final Office Action, dated Oct. 21, 2014, for U.S. Appl. No. 13/678,077 (54.82) filed Nov. 15, 2012, invented by Thomas Cherel et al., Total 18 pages.

Response to Final Office Action, dated Jan. 21, 2015, for U.S. Appl. No. 13/678,077 (54.82) filed Nov. 15, 2012, invented by Thomas Cherel et al., Total 10 pages.

Office Action, dated May 22, 2015, for U.S. Appl. No. 13/678,077 (54.82), filed Nov. 15, 2012, invented by Thomas Cherel et al., Total 21 pages.

Response to Office Action, dated Jun. 30, 2015,for U.S. Appl. No. 13/678,077 (54.82), filed Nov. 15, 2012, invented by Thomas Cherel et al., Total 13 pages.

Final Office Action, dated Oct. 7, 2015, for U.S. Appl. No. 13/678,077, (54.82) filed Nov. 15, 2012, invented by Thomas Cherel et al., Total 23 pages.

Response to Final Office Action, dated Dec. 29, 2015, for U.S. Appl. No. 13/678,077, (54.82) filed Nov. 15, 2012, invented by Thomas Cherel et al., Total 14 pages.

Office Action, dated May 6, 2016, for U.S. Appl. No. 13/678,077, (54.82) filed Nov. 15, 2012, invented by Thomas Cherel et al., Total 22 pages.

Response to Office Action, dated Jul. 29, 2016, for U.S. Appl. No. 13/678,077, (54.82) filed Nov. 15, 2012, invented by Thomas Cherel et al., Total 11 pages.

Information Materials for IDS dated Jul. 25, 2016, for Chinese Office Action dated Jun. 21, 2016, Total 4 pages.

Notice of Allowance, dated Nov. 3, 2016, for U.S. Appl. No. 13/678,077, (54.82) filed Nov. 15, 2012, invented by Thomas Cherel et al., Total 25 pages.

312 Amendment, dated Dec. 2, 2016, for U.S. Appl. No. 13/678,077, (54.82) filed Nov. 15, 2012, invented by Thomas Cherel et al., Total 7 pages.

* cited by examiner

DESTRUCTION OF SENSITIVE INFORMATION

CROSS-REFERENCE TO RELATED APPLICATION

This patent application is a continuation of U.S. patent application Ser. No. 13/678,077, filed on Nov. 15, 2012, which patent application is incorporated herein by reference in its entirety.

FIELD

Embodiments of the invention relate to ensuring destruction of sensitive information in, for example, database systems.

BACKGROUND

Today, Personally Identifiable Information (PII) is stored in many commercial software systems, such as hierarchical, columnar, and relational database systems, as well as in Hadoop/Big Data processing infrastructures. Conventional systems may protect PII with, for example access restrictions using authentication and authorizations.

In addition, conventional systems may protect PII with, for example, encryption. Such encryption includes encryption of data at rest (backups, etc.) and encryption on data in transmission (e.g., by encrypting the communication channel (e.g., Secure Socket Layer (SSL)), by encrypting the data in transfer (message encryption), by a combination of encrypting the communication channel and the data in transfer, and by audit trails).

Some conventional systems detect PII in a database. However, PII is just one example of sensitive information, and there are other types of sensitive information (such as salary information, performance reviews, confidential product plans, etc.).

Within conventional database systems, sensitive information (e.g., PII) once it is no longer needed should be destroyed. However, some conventional systems do not properly destroy such sensitive information. For example, if a table containing sensitive information is dropped in a database, but no measure is taken to overwrite the appropriate areas on the hard disk where the table was stored, this leaves the sensitive information on the hard disk vulnerable to hard disk discovery tools.

A single node database system may be described as a database installed on a server that has 4 tablespaces, where: tablespace TS1 contains the tables T1, T2 and T3, where tablespace TS2 contains the tables T4, T5, and T6, where tablespace TS3 contains the tables T7, T8 and T9, and where tablespace TS4 contains the tables T10 and T11. As storage for the database, there are two storage systems, each containing six hard disks where, in the two storage systems: eight of the hard disks have file systems managed by an operating system and four of the hard disks are used as raw devices, which means there are no file systems managed by the operating system on these four hard disks.

With reference to the single node database system, assume that the tablespace TS4 has been created with the following Statement 1 using the four raw devices:

Statement 1

CREATE TABLESPACE T4
MANAGED BY DATABASE

-continued

Statement 1

USING (DEVICE '/dev/rhdisk0' 10000,
    DEVICE '/dev/rhdisk1' 10000,
    DEVICE '/dev/rhdisk2' 10000,
    DEVICE '/dev/rhdisk3' 10000 )

With Statement 1, table T10 and table T11 are created in tablespace TS4. Assume table T10 contains sensitive information (e.g., PII) and is dropped. In this scenario, conventional techniques used with file systems for deleting PII cannot be used to ensure that the portions of the four raw devices that contained the sensitive information are securely deleted (e.g., by overwriting the sensitive information several times with zeros, etc.) so that the information is not recoverable with disk recovery tools. This is because the operating system and file system can not affect the hard disks used as raw devices that are managed by the database.

Continuing with the example of the single node database system, assume that the tablespace TS1 has been created with the following statement 2:

Statement 2

CREATE TABLESPACE T1
MANAGED BY DATABASE USING (FILE 'C.\db2\file1' 1 M,
FILE 'D:\db2\file2' 1 M)
    AUTORESIZE YES
    INCREASESIZE 2 M
    MAXSIZE 100 M In this case, tablespace TS1 uses two file containers with an initial size of 1 megabyte (MB), a growth rate of 2 megabytes and a maximal size of 100 megabytes. A file container may be described as a file on a file system. This means, tables T1, T2 and T3 in tablespace TS1 can allocate jointly a maximum size of 200 MB (2 file containers with a maximum size of 100 megabytes each). Now, assume T2 is a table containing sensitive information and T2 is dropped. Unlike the scenario using Statement 1, there is now a file system layer between the operating system and the database. However, only the database knows which portions of the two file containers file1 and file2 were used by the database, and, thus, need to be cleaned (e.g., by overwriting the appropriate portions with zeros, etc.) to ensure the sensitive information cannot be recovered. Therefore, the well understood techniques used with file systems for deleting PII can not be used to ensure that the portions that contained the sensitive information are securely deleted.

A multi-node database system includes multiple nodes. A node may be described as a separate computing device, such as a server system. For this example, a database is partitioned across multiple nodes. As storage for the database, there are three storage systems accessed by Network Attached Storage (NAS), with each of the storage systems containing six hard disks where, in two storage systems: six of the hard disks have file systems managed by an operating system, six of the hard disks are used as raw devices and do not have file systems managed by the operating system, and four of the hard disks have Encrypting File Systems (EFS).

A tablespace may span across one or more nodes. A partition group clause may be used to adjust the number of nodes that the tablespace may span in a fine granular manner. A table may be split across several partitions.

If combined with file system techniques, such as, Global Parallel File System (GPFS), there is an additional abstraction layer between the storage devices and the file systems involved, hiding from the file space consumers such as the database the details of the underlying physical storage hardware to improve business resiliency).

Similarly to the single node database system, with a multi-node database system, it is difficult to destroy sensitive information when a tablespace is dropped.

In conventional systems, only the database knows which portions of a hard disk/file system belongs to a table and should be cleaned for destruction of sensitive information.

Some conventional systems use file system encryption techniques. Such file system encryption techniques may not be used in case of high-end performance requirements on the database because of their performance impact and Input/Output (I/O) operations are a performance constraint for any database operations. Moreover, in case of raw devices, there is no file system involved, and so these file system encryption techniques are unavailable.

SUMMARY

Provided are a method, computer program product, and system for deleting sensitive information in a database. One or more objects in a database that are accessed by a statement are identified. It is determined that at least one object among the identified one or more objects contains sensitive information by checking an indicator for the at least one object. One or more security policies associated with the at least one object are identified. The identified one or more security policies are implemented for the at least one object to delete sensitive information.

BRIEF DESCRIPTION OF THE SEVERAL VIEWS OF THE DRAWINGS

Referring now to the drawings in which like reference numbers represent corresponding parts throughout:

FIG. 5 if formed by FIG. 5A and FIG. 5B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
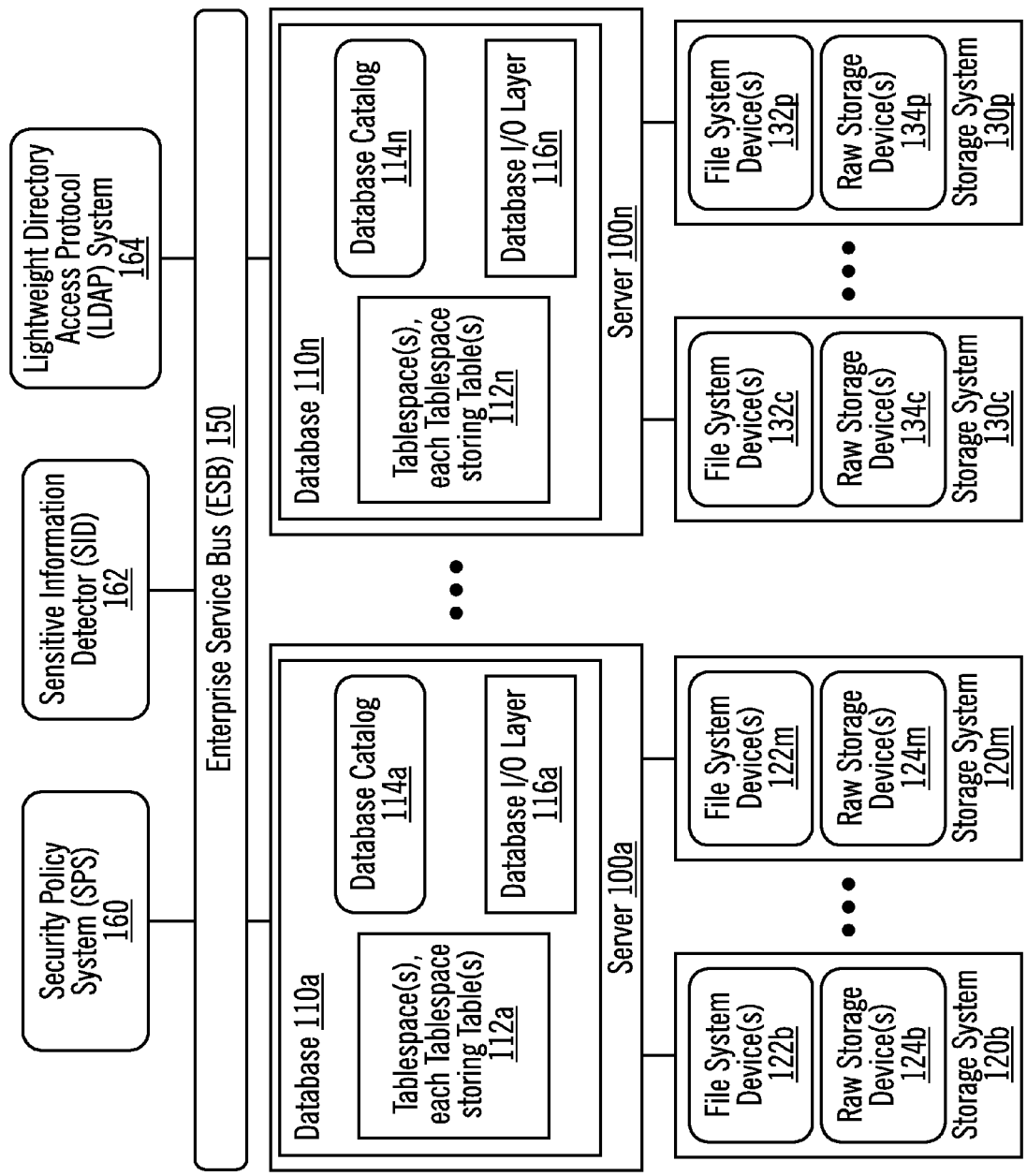
FIG. 1 illustrates a computing environment in accordance with certain embodiments.

FIG. 1 illustrates a computing environment with multiple servers in accordance with certain embodiments. Servers $100a \ldots 100n$ (where a and n represent positive integers) are coupled to an Enterprise Service Bus (ESB) 150. Each server $100a \ldots 100n$ contains a database $110a \ldots 110n$. Each database $110a \ldots 110n$ includes one or more tablespaces, with each tablespace storing one or more tables $112a \ldots 112n$. Each database $110a \ldots 110n$ also includes a database catalog $114a \ldots 114n$ and a database I/O layer $116a \ldots 116n$.

Each server $100a \ldots 100n$ is coupled to storage systems. In various embodiments, different servers may be coupled to different numbers of storage systems. In FIG. 1, server $100a$ is coupled to storage systems $120b \ldots 120m$ (where b and m represent positive integers). Each storage system $120b \ldots 120m$ includes one or more file system devices $122b \ldots 122m$ and one or more raw storage devices $124b \ldots 124m$. In FIG. 1, server $100n$ is coupled to storage systems $130c \ldots 130p$ (where c and p represent positive integers). Each storage system $130c \ldots 130p$ includes one or more file system devices $132c \ldots 132p$ and one or more raw storage devices $134c \ldots 134p$.

Also, a security policy system 160, a sensitive information detector 162, and a Lightweight Directory Access Protocol (LDAP) system 164 are coupled to the ESB 150. Via the ESB 150, the servers $100a \ldots 100n$ interact with the security policy system 160, the sensitive information detector 162, and the LDAP system 164. The LDAP system 164 is used to identify users of the databases and servers, and to specify what groups they are in (where the group membership is used for authorization rules used when accessing the databases and servers). In certain embodiments, database systems may delegate the task for authentication of users to an enterprise-wide LDAP system 164 by integrating with the LDAP system 164. Since authentication is done before the database enforces authorization privileges, the LDAP system 164 is included for an overall picture on access processes and the policies for known users registered in the LDAP repository.

Figure 2:
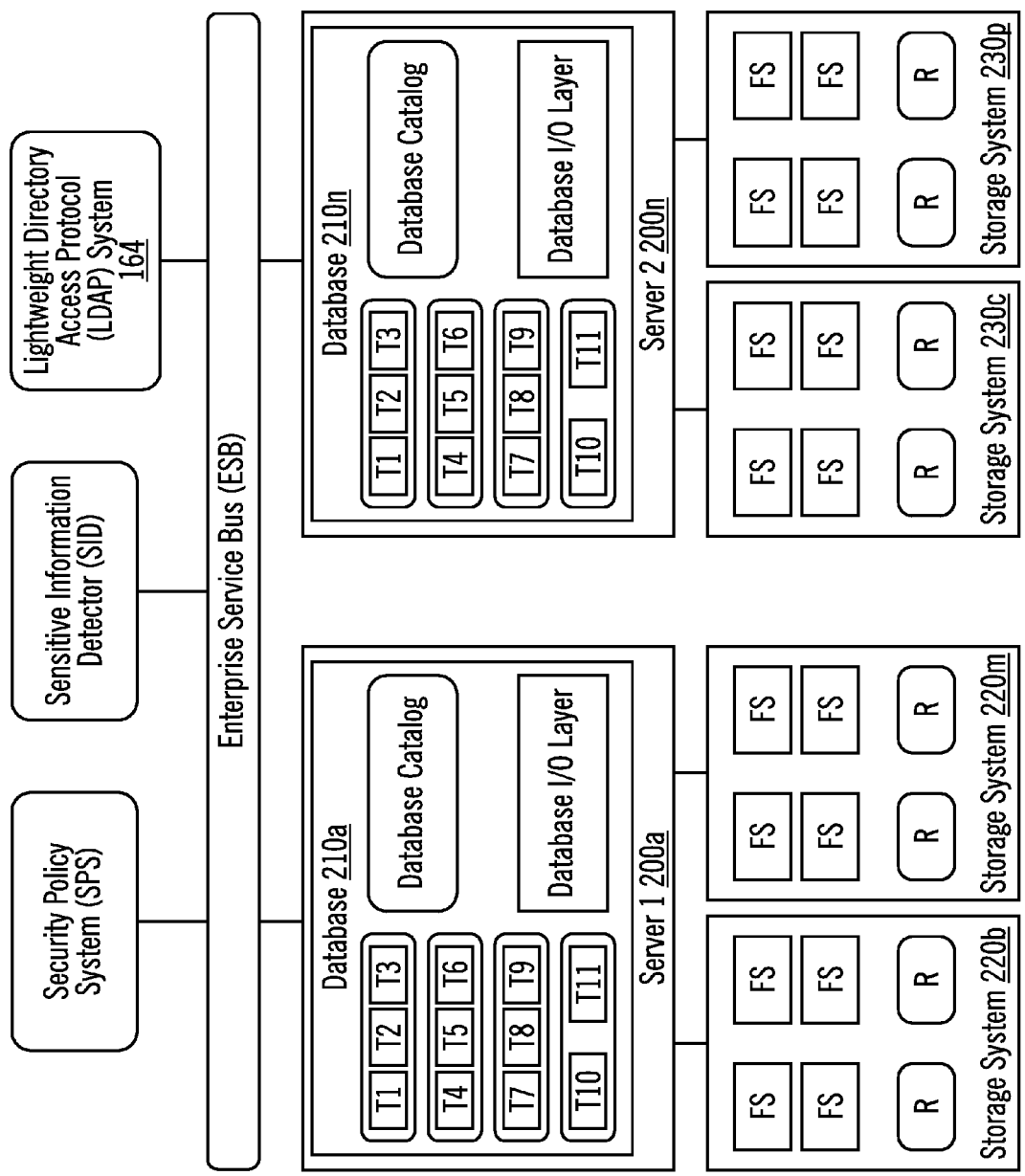
FIG. 2 illustrates a computing environment in accordance with certain alternative embodiments.

FIG. 2 illustrates a computing environment in accordance with certain alternative embodiments. In FIG. 2, server 200a includes a database 210a with eleven tables (T1-T11) in four tablespaces. Similarly, server 200n includes a database 210n with eleven tables (T1-T11) in four tablespaces. Also, server 200a is coupled to storage systems 220b, 220m, and each storage system 220b, 220m includes four file system devices (each represented by "FS") and two raw devices (each represented by "R"). Similarly, server 200n is coupled to storage systems 230c, 230p, and each storage system 230c, 230p includes four file system devices (each represented by "FS") and two raw devices (each represented by "R").

Embodiments provide:
extensions in the database catalog;
extensions of statement syntax for statements issued against the database (e.g., Structured Query Language (SQL) statements);

extensions in the database I/O layer;
a security policy system;
a sensitive information detector; and
integration of these components into a unified, end to end (e2e) tightly integrated solution.

Extensions in the Database Catalog

The database catalog includes a table ("OBJECT_TABLES") that contains metadata about tables, a table ("OBJECT_INDEX") that contains metadata about indexes, and a table ("OBJECT_TABLESPACE") that contains metadata on tablespaces. With embodiments, each of the tables ("OBJECT_TABLES", "OBJECT_INDEX", and OBJECT_TABLESPACE) includes a secure delete column storing a secure delete indicator ("indicator") for each object (e.g., TABLE, INDEX, TABLESPACE) that indicates whether or not the object contains sensitive information. In certain embodiments, the secure delete indicator is a Boolean flag. One setting of the secure delete indicator (e.g., set to true or "1") indicates that the object contains sensitive information, and another setting of the secure delete indicator (e.g., set to false or "0") indicates that the object does not contain sensitive information.

Also, with embodiments, each of the tables ("OBJECT_TABLES", "OBJECT_INDEX", and OBJECT_TABLESPACE) includes a security policies column (i.e., a field) storing the locations of one or more security policies associated. In certain embodiments, each row of the security policies column (which is associated with an object) contains one or more pointers (e.g., a Uniform Resource Locator (URL) to applicable security policies for that object. With embodiments, the pointers to applicable security policies may be managed externally. This allows the security policies to be changed at any time and enforced at runtime.

In various embodiments, other objects (other than tables, indexes, and tablespaces) may have tables in the database catalog that are also extended with a secure delete column and a security policies column.

Figure 3:
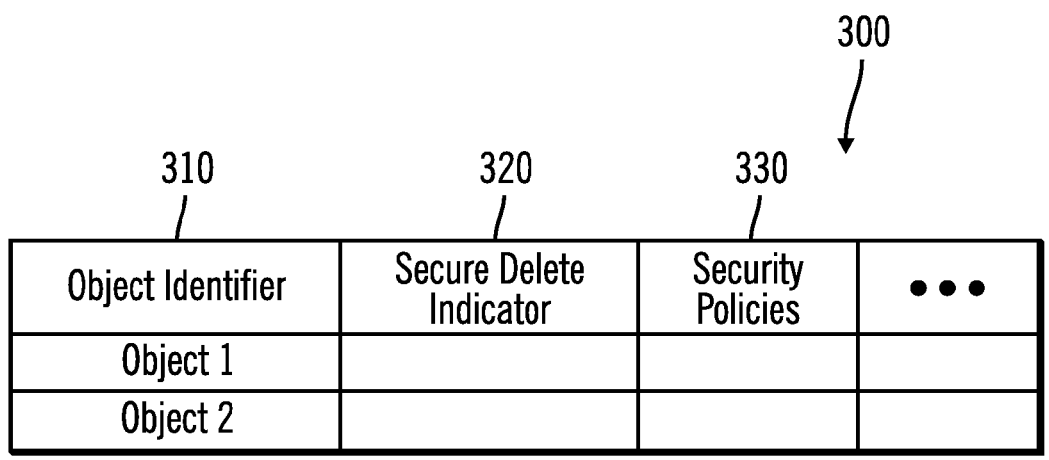
FIG. 3 illustrates an example a table in a database catalog in accordance with certain embodiments.

FIG. 3 illustrates an example table 300 in a database catalog in accordance with certain embodiments. Table 300 includes an object identifier, 310, a secure delete column 320, and a security policies column 330. The ellipses indicate that table 300 may include other columns.

Figure 4:
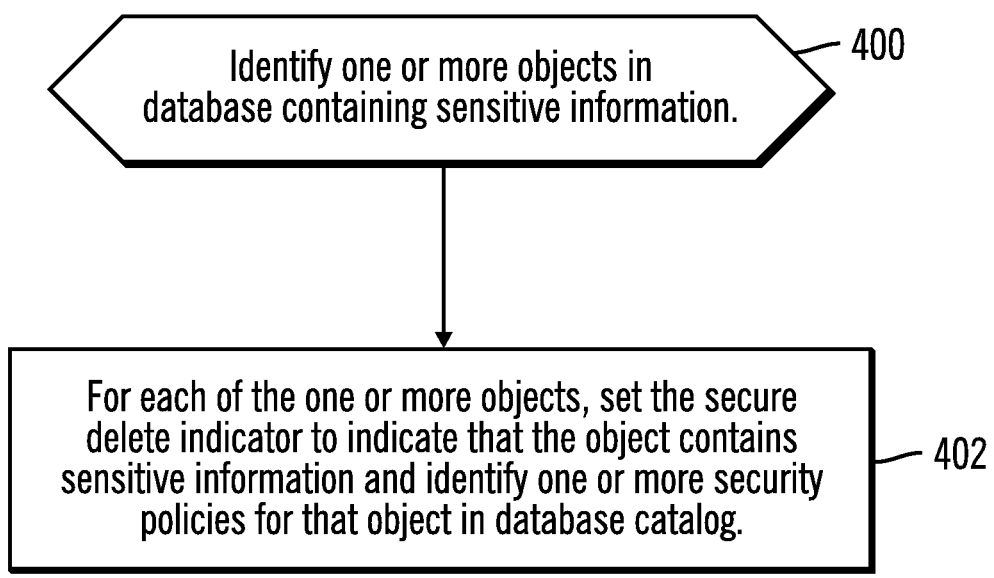
FIG. 4 illustrates, in a flow diagram, operations for storing data in the database catalog in accordance with certain embodiments.

FIG. 4 illustrates, in a flow diagram, operations for storing data in the database catalog in accordance with certain embodiments. Control begins at block 400 with the sensitive information detector identifying one or more objects in the database that are storing sensitive information. In block 402, for each of the one or more objects, the sensitive information detector sets the secure delete indicator to indicate that the object contains sensitive information and identifies one or more security policies for that object in database catalog.

Thus, in certain embodiments, the sensitive information detector performs periodic audits in each database to search for objects containing sensitive information and, if found, sets the secure delete indicator in the database catalog to indicate that the object contains sensitive information.

Extensions of Statement Syntax

Embodiments extend the syntax of statements that are issued against the database by adding "DELETE SECURE LEVEL" to the statement. The use of "DELETE SECURE LEVEL" indicates to the database secure deletion is to be performed, and the "LEVEL" identifies a degree of secure erasure to be performed. For example, some standards consider a one-pass overwrite with random data or zeros to be sufficient to securely delete data on disk. This might be considered level 1. Other standards may use multiple writes to overwrite the data, with different data patterns. This might be considered level 2. For example, the following is a list including example statements (e.g., in SQL) with extended syntax, but embodiments are not limited to such examples:

```
DROP TABLE [...] DELETE SECURE LEVEL <INT>
DROP INDEX [...] DELETE SECURE LEVEL <INT>
DROP TABLESPAC [...] DELETE SECURE LEVEL <INT>
ALTER TABLESPACE [...] DELETE SECURE LEVEL <INT>
ADMIN_MOVE_TABLE [...] DELETE SECURE LEVEL <INT>
```

In various embodiments, there may be other objects in the database containing sensitive information (e.g., temporary tables or temporary table spaces that the database might use for processing). Therefore, the above list is non-exhaustive and other statements may be extended to include the use of "DELETE SECURE LEVEL" across various database implementations.

"DELETE SECURE" is an optional clause for statements that access the database. If the "DELETE SECURE" option is specified in a statement, then, depending on the LEVEL chosen, the secure destruction of the sensitive information is done in one of multiple ways. The following are examples of secure destruction of the sensitive information:

a raw device is released (e.g., after a DROP TABLESPACE or ALTER TABLESPACE statement)

a file container is released (e.g., when a file on the file system is released with a DROP TABLESPACE or an ALTER TABLESPACE command)

portions of a file are released (e.g. after a DROP TABLE or a ADMIN_MOVE_TABLE)

For different operating system platforms, there may be different implementations available for secure destruction of the sensitive information. Furthermore, depending on the requirements outlined by the security policy from the set of all available techniques, in some embodiments, a subset of the available techniques may be permissible. In certain embodiments, the database includes at least one implementation for each operating system platform and provides additional libraries for additional techniques.

Figure 5A:
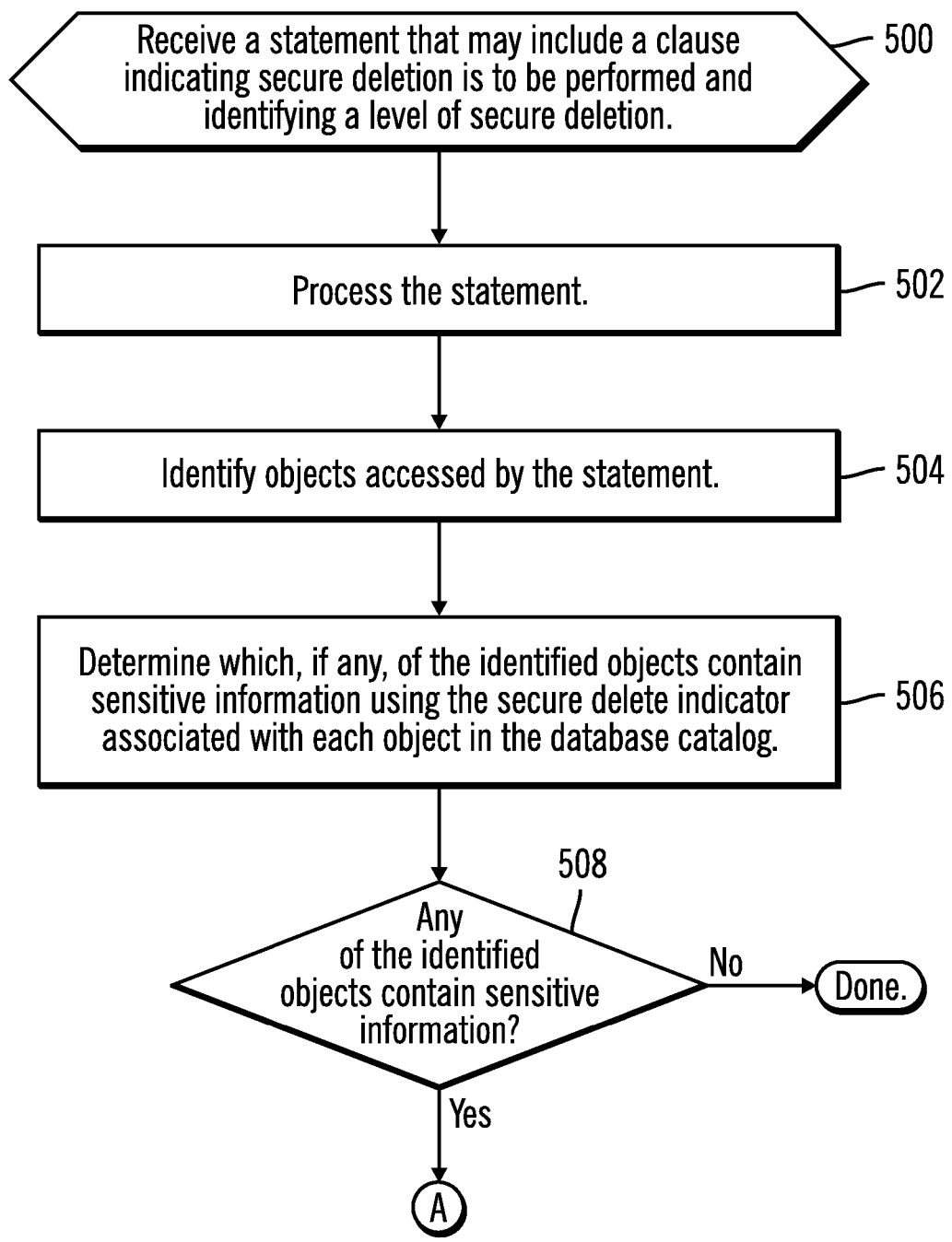
FIG. 5 illustrates, in a flow diagram, operations for processing a statement with secure deletion of sensitive information in accordance with certain embodiments.
Figure 5B:
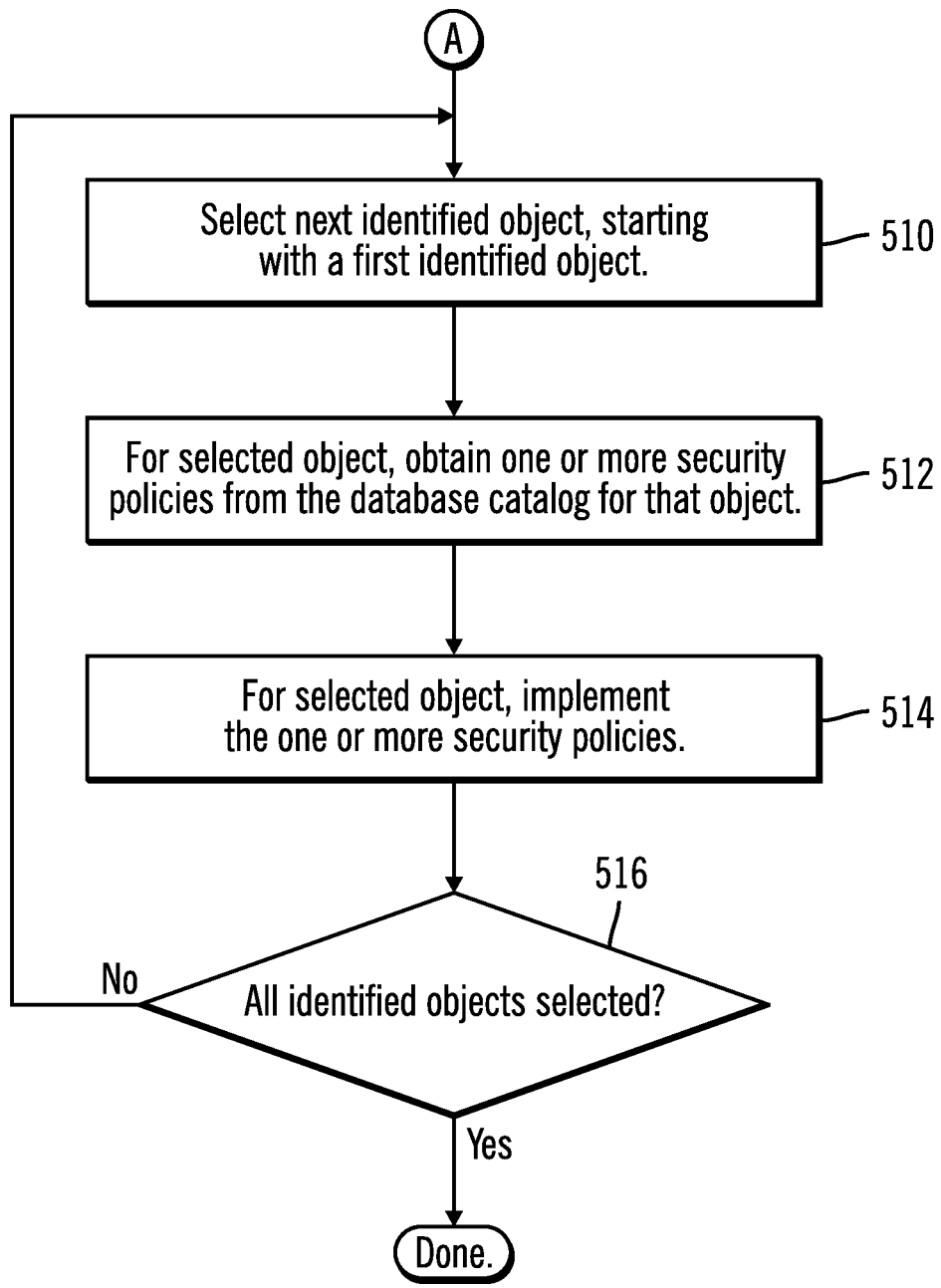

FIG. 5 illustrates, in a flow diagram, operations for processing a statement with secure deletion of sensitive information in accordance with certain embodiments. FIG. 5 if formed by FIG. 5A and FIG. 5B. Control begins at block 500 with the database receiving a statement that may include a clause indicating secure deletion is to be performed and identifying a level of secure deletion (e.g., a "DELETE SECURE" clause). As mentioned above, the "DELETE SECURE" clause is optional, and sometimes, the author of the statement may forget to include the "DELETE SECURE" clause. Whether or not the "DELETE SECURE" clause is included in the statement, the database performs secure deletion of sensitive information. In block 502, the database processes the statement. For example, if the statement is to drop a table, the table is dropped. In block 504, the database identifies objects accessed by the statement. In block 506, the database determines which, if any, of the identified objects contain sensitive information using the secure delete indicator associated with each object in the database catalog. That is, for each of the identified objects, the database checks the database catalog to determine whether the secure delete indicator is set to indicate that the object contains sensitive information.

In block 508, the database determines whether any of the objects have been identified as containing sensitive information. If such objects have been identified processing continues to block 510 (FIG. 5A), otherwise, processing is done.

In block 510, the database selects a next identified object, starting with a first identified object from the identified objects. In block 512, for the selected object, the database obtains one or more security policies from the database catalog for that object. In block 512, if the statement (received in block 500) included a clause indicating secure deletion is to be performed and identifying a level of secure deletion, then this information is used by the database to select one or more security policies. If the statement did not include this clause, the database selects a default security policy. In block 514, for the selected object, the database implements the one or more security policies. In block 516, the database determines whether all of the identified objects have been selected. If so, processing is done, otherwise, processing continues to block 510.

In certain embodiments, for the operations of block 514, how the one or more security policies are enforced depend on factors, such as the file system (and thus the related operating system) versus raw disk and other low level technology details. Thus, how the policy enforcement operations of block 514 may differ due to such technology details.

Figure 6:
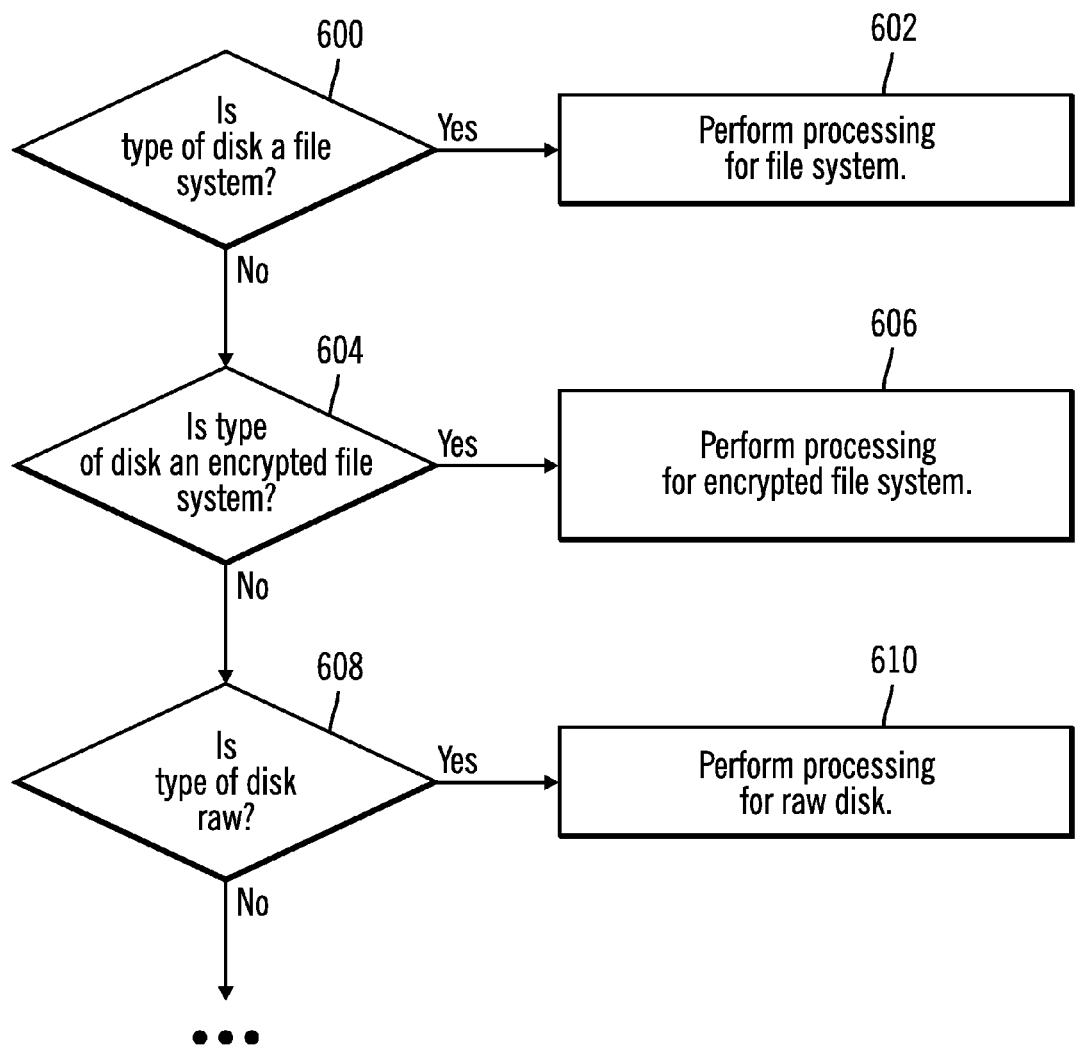
FIG. 6 illustrates, in a flow diagram, operations for implementing one or more security policies in accordance with certain embodiments.

FIG. 6 illustrates, in a flow diagram, operations for implementing one or more security policies in accordance with certain embodiments. Control begins at block 600 with the database determining whether the object is stored in a file system. If so, processing continues to block 602, otherwise, processing continue to block 604. In block 602, the database implements the one or more security policies for the file system.

In block 604, the database determines whether the object is stored in an encrypted file system. If so, processing continues to block 606, otherwise, processing continues to block 608. In block 606, the database implements the one or more security policies for the encrypted file system.

In block 608, the database determines whether the object is stored in raw disk. If so, processing continues to block 610, otherwise, processing continues to check the type of storage for the object and implements the one or more security policies for that type of storage (and this is represented by the ellipses in FIG. 6). In block 610, the database implements the one or more security policies for the raw disk.

In certain embodiments, the "DELETE SECURE" clause is implemented as follows:

For each object with sensitive information, in the database catalog, the secure delete indicator is enabled and one or more security policies are identified. The security policies define the permissible range of SECURE_DELETE choices, as well as, a default choice.

If the author forgets the DELETE SECURE optional clause in a statement that accesses at least one object containing sensitive information for which the secure delete indicator is set to indicate that the object contains sensitive information (e.g., when dropping a table containing sensitive information), the database determines that the object is to be securely deleted with the default choice.

If the author explicitly sets the DELETE SECURE clause and identifies a level, the level indicates one or more security policies (e.g., from set of permissible choices). In certain embodiments, the author can query the database catalog to obtain the set of permissible choices.

Extensions in the Database I/O Layer

The database I/O layer invokes libraries performing the secure delete operations to overwrite hard disk areas as needed to assure proper deletion. In certain embodiments, such invocations are compliant with Atomicity, Consistency, Isolation, Durability (ACID) properties of a transactional database, may performed in the background, and may be resilient against power outages.

Security Policy System

In certain embodiments, the security policy system enables creation of one or more security policies by a database administrator or other user. Each security policy defines specific means for destroying secure information. In certain embodiments, a security policy is equivalent to a level. For example, a security policy may indicate that secure information is to be overwritten three times. In certain additional embodiments, the one or more security policies may be imported as part of a relevant security standard.

Figure 7:
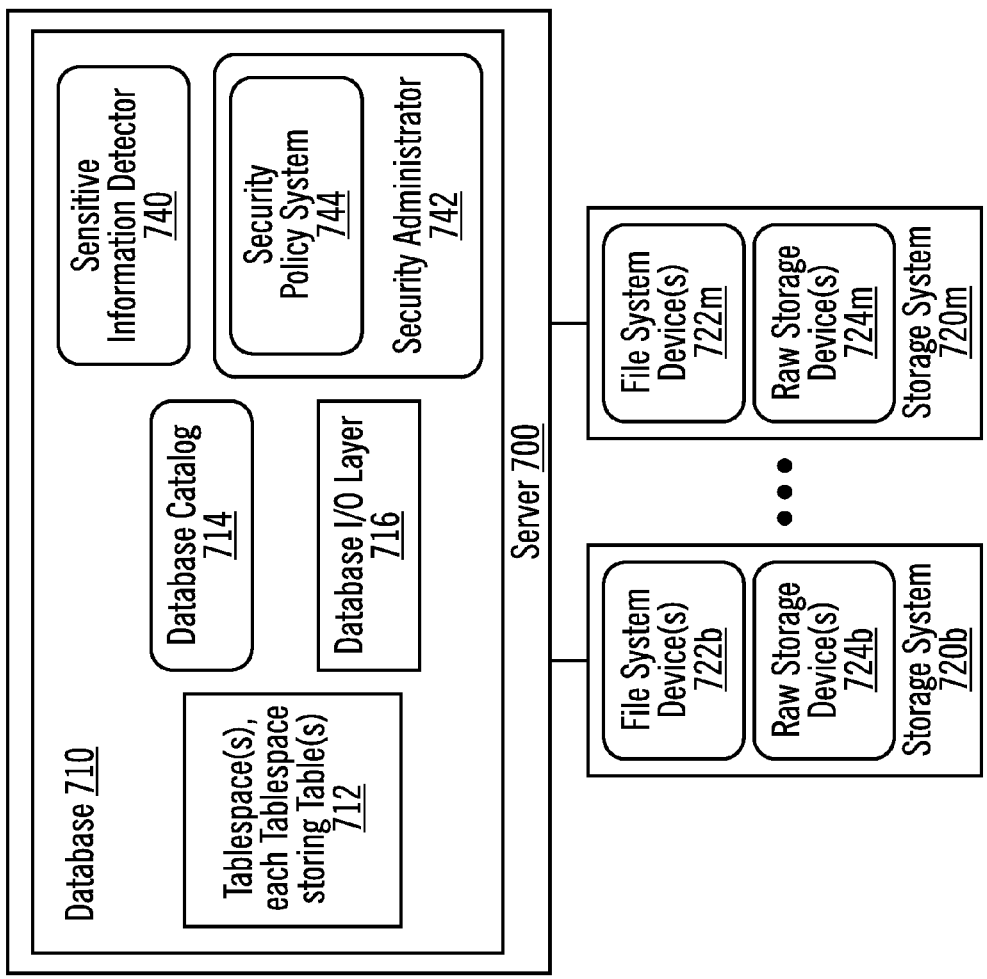
FIG. 7 illustrates a computing environment with a single server in accordance with certain embodiments.

FIG. 7 illustrates a computing environment with a single server in accordance with certain embodiments. In FIG. 7, the server 700 includes a database 710. The database 710 includes one or more tablespaces, with each tablespace storing one or more tables 712. The database 7 also includes a database catalog 714, a database I/O layer 716, a sensitive information detector 740, and a security administrator 742. The security administrator 742 includes a security policy system 744.

The server 700 is coupled to storage systems 720*b* . . . 720*m* (where b and m represent positive integers). Each storage system 720*b* . . . 720*m* includes one or more file system devices 722*b* . . . 722*m* and one or more raw storage devices 724*b* . . . 724*m*.

Figure 8:
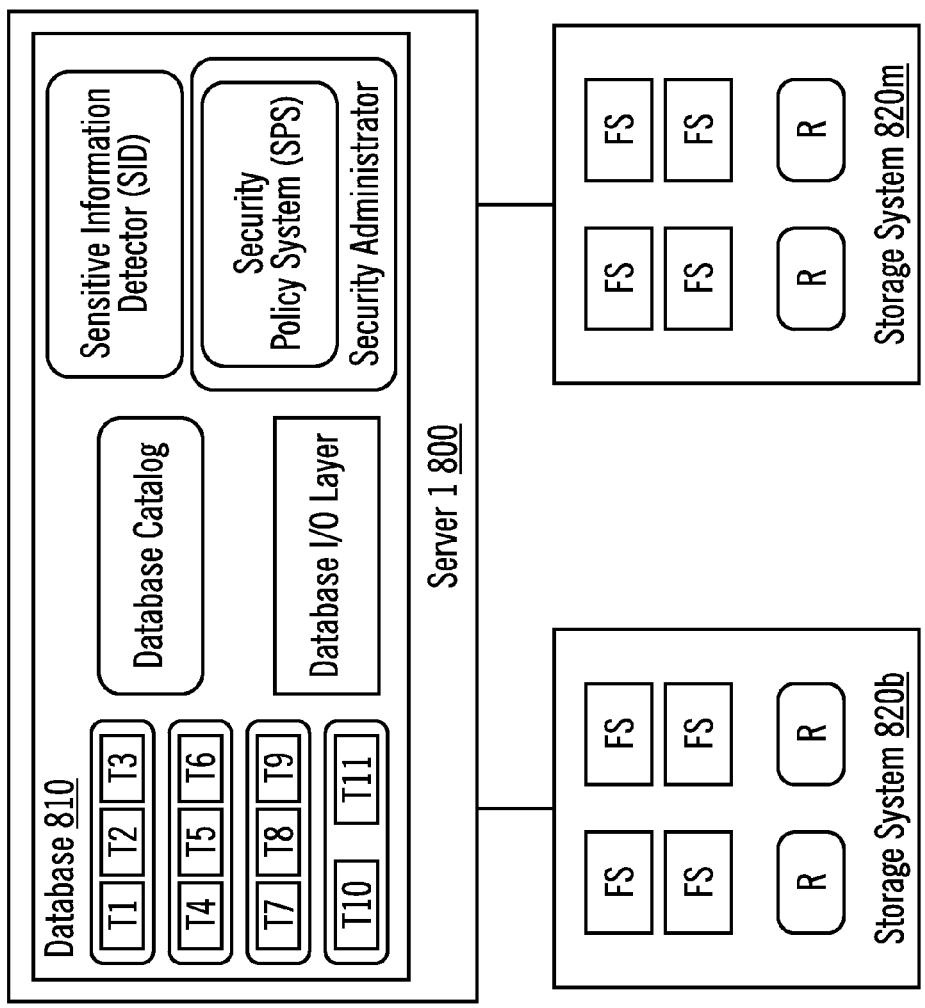
FIG. 8 illustrates a computing environment with a single server in accordance with certain alternative embodiments.

FIG. 8 illustrates a computing environment with a single server in accordance with certain alternative embodiments. In FIG. 8, server 800 includes a database 810 with eleven tables (T1-T11) in four tablespaces. Also, server 800 is coupled to storage systems 820*b*, 820*m*, and each storage system 820*b*, 820*m* includes four file system devices (each represented by "FS") and two raw devices (each represented by "R").

In certain embodiments, the security administrator controls security aspects of the database. In certain embodiments, the security administrator is extended with the policy concepts around secure destruction of sensitive information. In such embodiments, the sensitive information detector 162 is moved into the database. Then, the security administrator may control, for example, how often the sensitive information detector is searching for sensitive information in the database, the database user who can trigger the sensitive information detector to initiate the search for sensitive information.

In certain embodiments, each server (e.g., 100*a* . . . 100*n*, 200*a*, 200*n*, 300, 400) has the architecture of computing node 910 (shown in FIG. 9) and is part of a cloud environment. In certain alternative embodiments the servers are not part of a cloud environment.

Embodiments provide tight integration of secure destruction of sensitive information techniques into a database system to ensure secure deletion of sensitive areas on a hard disk.

Embodiments discover sensitive information in the database, mark in the database catalog a table or tablespace as containing sensitive information, and link space used by a table or tablespace to the underlying physical devices. With embodiments, the database triggers a true "destruct" operation with an appropriate interface to the file system. With embodiments, the database triggers a true "destruct" in the transactional log files. Embodiments provide a policy language to allow specifying different levels of security.

Embodiments assure deletion of sensitive information at the time it is no longer needed, which reduces the risk of compromise of sensitive information, at a low operational cost due to tight integration with the database.

Embodiments provide secure destruction of sensitive information in a database for database operations such as: DROP TABLESPACE, ALTER TABLESPACE (e.g., a container can be dropped using this statement), DROP TABLE, DROP INDEX (e.g., fields in index structures may contain sensitive information), ONLINE TABLE MOVE, DROP DATABASE.

Embodiments provide secure destruction of sensitive information in the transactional log of the database which has also hard disk persistency. Embodiments provide secure destruction of sensitive information for a database that uses raw devices not involving any file system and when the file system does not know which parts containing sensitive information belong to a table in a tablespace.

Embodiments ensure proper deletion of sensitive information when hard disk/file system encryption and/or database encryption can not be used.

Embodiments provide secure destruction of sensitive information when sensitive information is detected after the database became in use (e.g., during an audit, where a move to another database system is not practical). For these cases, neither hard disk/file system encryption nor database encryption is used because the data has already been physically created without encryption.

Embodiments provide secure destruction of sensitive information by allowing creation of a policy to tell the database how to deal with sensitive information and using metadata in the database catalog to mark a table or tablespace as containing sensitive information.

Embodiments may be used when a new regulation might make sensitive which was not sensitive before, when a company expands into countries which have strong data privacy laws (e.g. a US company expanding into European countries), when an audit shows that database systems contain sensitive information and should follow stronger security controls. Although access may be restricted in such scenarios, embodiments provide secure deletion of the sensitive information. Embodiments avoid the need to move the data from one database using non-encrypted file systems to another database using encrypted file systems (which may be difficult for cost and time reasons).

Without secure deletion of sensitive information by the database it is difficult to tell whether hard disks thrown away still contain sensitive information, exposing a company to security risks. Also internal attackers with access to the file system layer (but not necessary to the database since many enterprises have separate operating system and database administration teams) might be able to discover sensitive information on hard disks where the data from a database point of view has been deleted with the DROP operation.

Embodiments ensure proper deletion of sensitive information in a cloud computing infrastructure where database system are deployed in infrastructure from a cloud service provider.

Embodiments enhance a database I/O layer to destroy sensitive information during various operations based on the SQL language enhancements. In certain embodiments, the database is a Relational Database Management System (RDBMS).

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
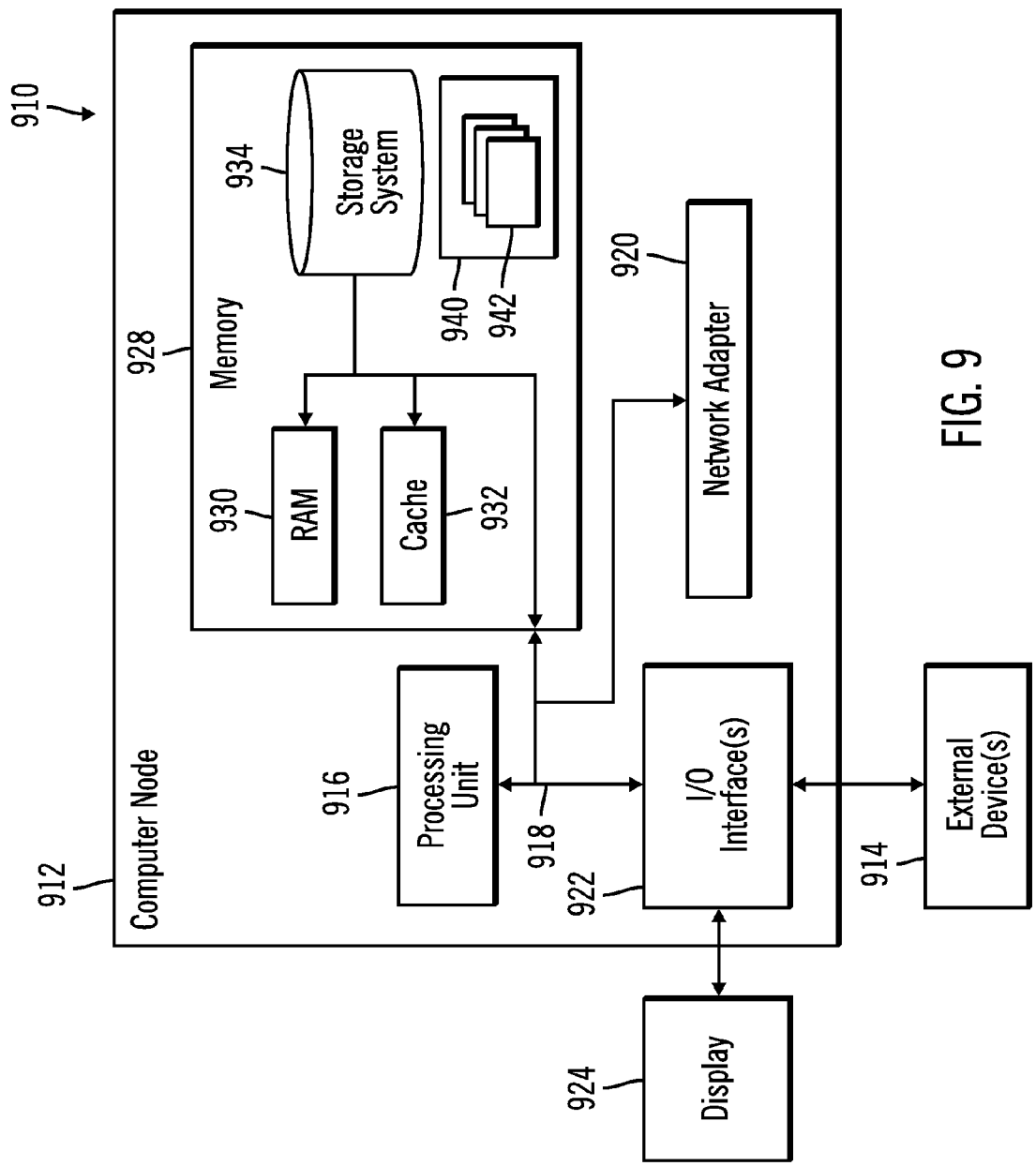
FIG. 9 depicts a cloud computing node in accordance with certain embodiments.

Referring now to FIG. 9, a schematic of an example of a cloud computing node is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
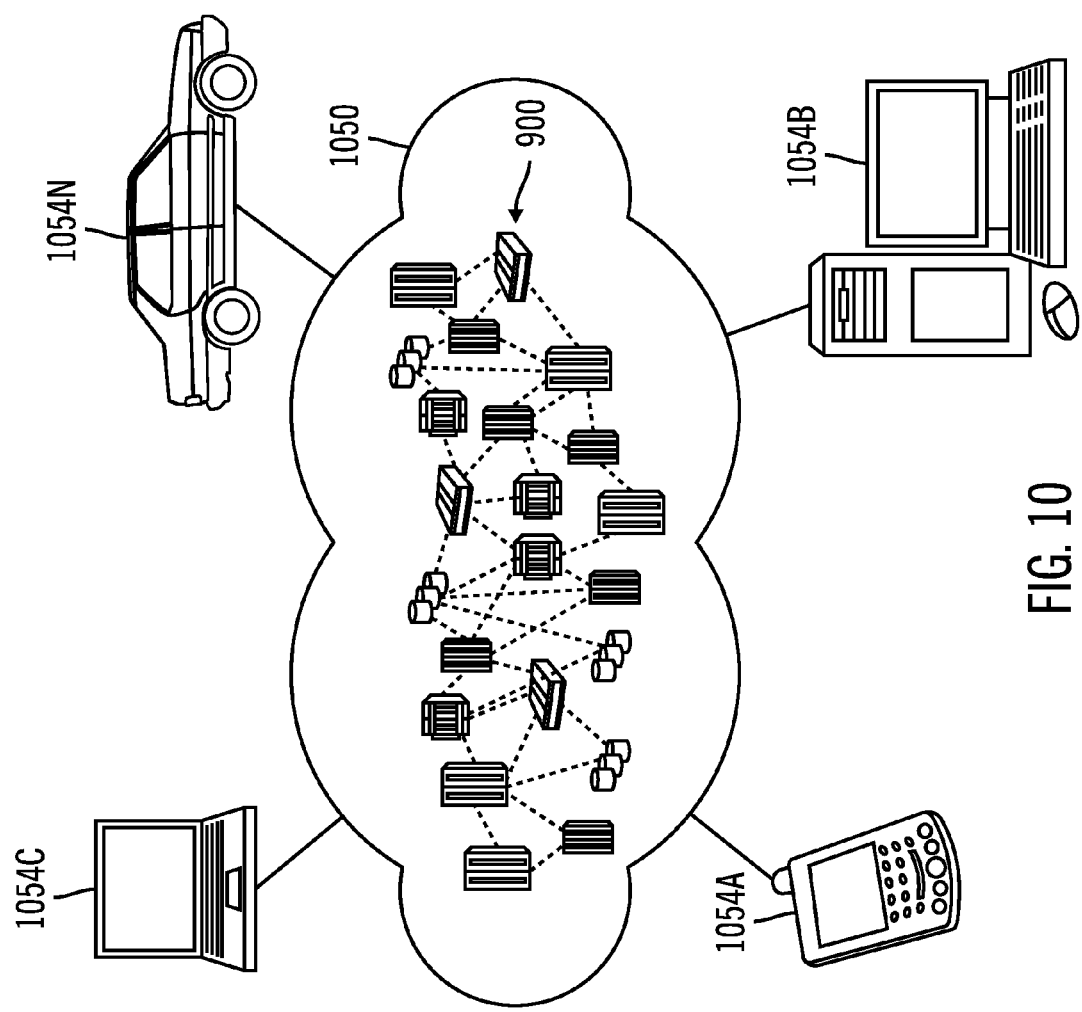
FIG. 10 depicts a cloud computing environment in accordance with certain embodiments.

Referring now to FIG. 10, illustrative cloud computing environment 1050 is depicted. As shown, cloud computing environment 1050 comprises one or more cloud computing nodes 910 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 910 and cloud computing environment 1050 can communicate with any type of computerized device over any type of network and/or network addressable connection (e.g., using a web browser).

Figure 11:
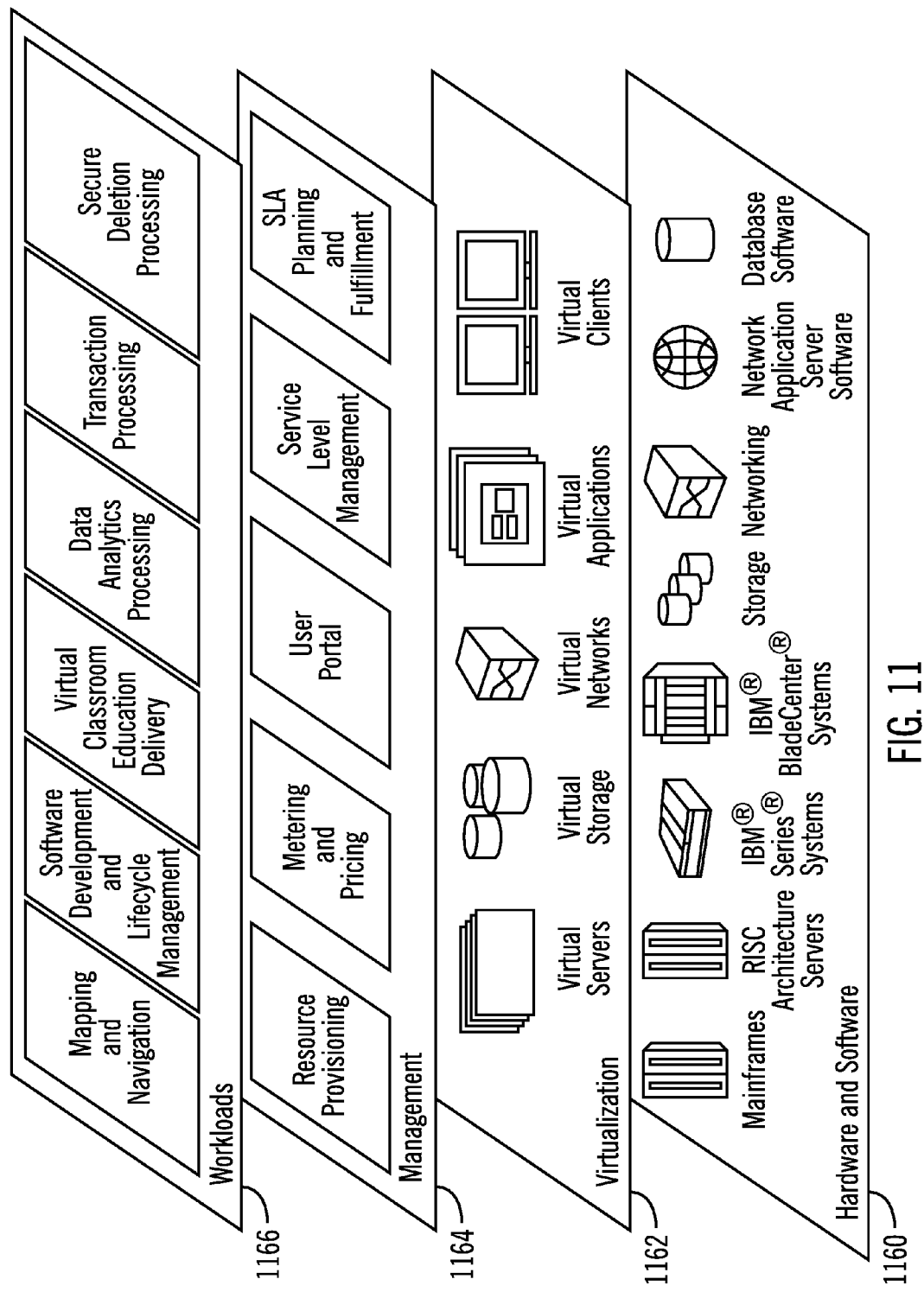
FIG. 11 depicts abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1162 provides an abstraction layer from which the following examples of virtual entities may be provided: virtual servers; virtual storage; virtual networks, including virtual private networks; virtual applications and operating systems; and virtual clients.

In one example, management layer 1164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1166 provides examples of functionality for which the cloud computing environment may be utilized. Examples of workloads and functions which may be provided from this layer include: mapping and navigation; software development and lifecycle management; virtual classroom education delivery; data analytics processing; transaction processing; and secure deletion processing.

Thus, in certain embodiments, software or a program, implementing secure deletion of sensitive information in accordance with embodiments described herein, is provided as a service in a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
providing, using a processor of a computer, a database that includes a database catalog and a database Input/Output (I/O) layer;
providing statements that include a delete secure level clause, wherein the statements comprise a DROP TABLE statement, a DROP INDEX statement, a DROP TABLESPACE statement, an ALTER TABLESPACE statement, and an ADMIN_MOVE_TABLE statement, wherein the statements are executed against the database;
storing a table in the database catalog that includes a secure delete column with an indicator that indicates whether each object in the database has secure information and a security policies column storing locations of security policies for each object in the database;
receiving a statement from the statements that identifies one or more objects in the database to be accessed and that specifies a level of secure deletion from among different levels of secure deletion with the delete secure level clause, wherein the level of secure deletion indicates how to overwrite the secure information;
determining that at least one object among the identified one or more objects contains sensitive information by checking an indicator in the secure delete column of the table in the database catalog for the at least one object, wherein the at least one object that contains sensitive information is stored in one of a raw device, a file container or a portion of a file;
identifying the security policies in the security policies column of the table in the database catalog that are associated with the at least one object and that specify details of a secure deletion procedure;
selecting one or more of the identified security policies based on the level identified in the statement; and
implementing the selected one or more of the identified security policies for the at least one object to delete the sensitive information by invoking, with the database I/O layer, one or more secure delete operations comprising at least one of releasing the raw device, releasing the file container or releasing the portion of the file.

2. The method of claim 1, wherein the statement includes the delete secure level clause indicating that secure deletion is to be performed for at least one object accessed by that statement.

3. The method of claim 1, wherein the security policies column of the table in the database catalog stores a pointer to the security policies for the at least one object.

4. The method of claim 1, further comprising:
in response to storing the at least one object in the database,
setting the indicator to indicate that the at least one object contains sensitive information; and
storing a location of the security policies to be implemented when deleting that at least one object.

5. The method of claim 4, wherein each of the security policies provides a default security choice and a permissible range of secure delete choices.

6. The method of claim 1, wherein each of the one or more objects comprises one of a tablespace, a table, and an index.

7. The method of claim 1, wherein a Software as a Service (SaaS) is provided to perform method operations.

* * * * *